(12) United States Patent
Sturtz

(10) Patent No.: US 7,768,499 B2
(45) Date of Patent: Aug. 3, 2010

(54) MOUTH-OPERATED COMPUTER INPUT DEVICE AND ASSOCIATED METHODS

(75) Inventor: Charles R. Sturtz, Orlando, FL (US)

(73) Assignee: Adiba, Inc., Orlando, IL (US)

( * ) Notice: Subject to any disclaimer, the term of this patent is extended or adjusted under 35 U.S.C. 154(b) by 958 days.

(21) Appl. No.: 11/550,999

(22) Filed: Oct. 19, 2006

(65) Prior Publication Data

US 2007/0085827 A1 Apr. 19, 2007

Related U.S. Application Data

(60) Provisional application No. 60/728,104, filed on Oct. 19, 2005.

(51) Int. Cl.
  G09G 5/00 (2006.01)
  G06F 3/033 (2006.01)
  H03K 17/94 (2006.01)
(52) U.S. Cl. ................ 345/157; 345/156; 345/163; 341/20; 341/21
(58) Field of Classification Search ............. 341/20–21; 345/156–184
See application file for complete search history.

(56) References Cited

U.S. PATENT DOCUMENTS

| | | | |
|---|---|---|---|
| 3,986,542 A | 10/1976 | Guy et al. ............. 144/34 E |
| 4,605,927 A | 8/1986 | Katz et al. ............ 340/825.19 |
| 4,783,656 A | 11/1988 | Katz et al. ............ 340/825.19 |
| 4,929,826 A | 5/1990 | Truchsess et al. ........... 250/221 |
| 5,128,671 A | 7/1992 | Thomas, Jr. ................ 341/20 |
| 5,149,980 A | 9/1992 | Ertel et al. ................ 250/561 |
| 5,212,476 A | 5/1993 | Maloney ............... 340/825.19 |
| 5,233,662 A * | 8/1993 | Christensen ................ 381/70 |
| 5,341,133 A | 8/1994 | Savoy et al. ................ 341/22 |
| 5,523,745 A | 6/1996 | Fortune et al. ........ 340/825.19 |
| 5,689,246 A * | 11/1997 | Dordick et al. ........ 340/825.19 |
| 6,222,524 B1 * | 4/2001 | Salem et al. ................ 345/157 |
| 6,598,006 B1 | 7/2003 | Honda et al. ............... 702/116 |
| 6,668,244 B1 | 12/2003 | Rourke et al. .............. 704/275 |
| 6,801,231 B1 | 10/2004 | Beltz ........................ 345/865 |
| 7,071,844 B1 * | 7/2006 | Moise ........................ 341/21 |
| 2004/0148174 A1 | 7/2004 | Ullman et al. ............. 704/275 |
| 2005/0275620 A1 * | 12/2005 | Manal ...................... 345/156 |

* cited by examiner

*Primary Examiner*—Bipin Shalwala
*Assistant Examiner*—Sosina Abebe
(74) *Attorney, Agent, or Firm*—Allen, Dyer, Doppelt, Milbrath & Gilchrist, P.A.

(57) ABSTRACT

A mouth-operated computer input device includes a mouthpiece to be positioned in a user's mouth, and an optical device carried by the mouthpiece for emitting light from a surface area thereof. The optical device controls movement of a cursor on a computer display based upon movement of the user's tongue across the surface area. The optical device includes a light emitting device for emitting the light, and a sensor adjacent the light emitting device for sensing the light reflected from the user's tongue. A processor calculates movement of the user's tongue based upon the light reflected therefrom.

22 Claims, 4 Drawing Sheets

MOUTH-OPERATED COMPUTER INPUT DEVICE AND ASSOCIATED METHODS

FIELD OF THE INVENTION

This application claims the benefit of U.S. Provisional Application Ser. No. 60/728,104 filed Oct. 19, 2005, the entire contents of which are incorporated herein by reference.

FIELD OF THE INVENTION

The present invention relates to the field of computer input devices, and more particularly, to a mouth-operated computer input device for operating a cursor in a computer system and associated methods.

BACKGROUND OF THE INVENTION

Input devices that control cursor movement of a computer system are also known as pointing devices, and include mice, trackballs and touch pads. These pointing devices are generally designed for hand use. There are a number of users with various physical disabilities that are unable to use a hand-operated computer input device. The use of a hand-operated computer input device is also problematic for restrictive environments and tasks that need both hands to be completely dedicated to a specific operation other than using the computer input device.

In lieu of hand-operated computer input devices, mouth-operated computer input devices are available. For example, U.S. Pat. No. 6,222,524 to Salem et al. discloses a mouth-operated computer mouse in which a pressure sensitive isometric joystick is used to perform cursor control. The shaft of the joystick points downwards and inwards towards the tip of the user's tongue. The shape of the shaft is conical so as to facilitate a greater ability of the tongue to manipulate the shaft from all directions. Applying varying amounts of force to the joystick changes the speed of cursor movement in the desired direction. Since speed and direction, not position, are the only controls on the cursor, skill must be developed to navigate the cursor to, and stopping on the desired target. A disadvantage of this system is that the necessary tongue activation for moving the cursor is too imprecise. The cursor will continually "hunt" for the target in a series of diminishing overshoots.

Another mouth-operated computer input device is provided in U.S. Pat. No. 7,071,844 to Moise, which discloses a curved housing shaped to closely engage the roof of the user's mouth against the front teeth. A touch pad is arranged on the bottom of the housing, and is operated by the user's tongue for controlling a cursor on a computer display. The touchpad comprises an XY array of pressure sensitive wires. As the tongue moves across the touchpad, the wires in the array that are contacting each other allow the computer system to calculate the direction and distance the tongue has moved from its original location. The pressure "footprint" of the tongue is large compared to that of a fingertip and increases with increased pressure. However, the area available in the mouth for an adequate size XY array is limited. As a result, repetitive tongue swipes are required to move the cursor any appreciable distance.

SUMMARY OF THE INVENTION

In view of the foregoing background, it is therefore an object of the present invention to provide a mouth-operated computer input device that allows for a more precise control when moving a cursor on a computer display.

This and other objects, features, and advantages in accordance with the present invention are provided by a mouth-operated computer input device comprising a mouthpiece to be positioned in a user's mouth, and an optical device carried by the mouthpiece for emitting light from a surface area thereof towards the user's tongue, and for controlling movement of a cursor on a computer display based upon movement of the user's tongue across the surface area.

Movement of the user's tongue across the surface area of the optical device results in proportional movement (not speed) of the cursor. This advantageously allows the user to more easily navigate movement of the cursor with their tongue. The mouth-operated computer input device provides control of a computer system with the speed and precision of a hand-held mouse without use of any hands. This is desirable to any person with a physical handicap. It is also beneficial to any person wishing to avoid repetitive motion injury, or operating in an environment of severe vibration or acceleration, or who has both hands otherwise occupied.

The optical device may comprise a light emitting device for emitting the light, and a sensor adjacent the light emitting device for sensing the light reflected from the user's tongue. The light emitting device may comprise a light emitting diode or a laser diode, and the sensor may comprise a digital camera, for example. The optical device may further comprise a processor for calculating movement of the user's tongue based upon the light reflected from the user's tongue.

The mouth-operated computer input device may further comprise first and second switches. The first switch is carried by the mouthpiece for clicking and dragging the cursor on the computer display based upon activation of the first switch. The second switch is carried by the mouthpiece for generating a pop-up window on the display based upon activation of the second switch. The first and second switches may comprise tactile or pressure sensitive switches.

The cursor may be generated based upon a computer system, and the mouth-operated computer input device may comprise a wired or wireless connection for interfacing with the computer system. The mouthpiece may be horseshoe shaped and surround a row of teeth in the user's mouth. The surface area of the optical device may form a bridge across the horseshoe shaped mouthpiece.

Another aspect of the present invention is directed to a method for controlling movement of a cursor on a computer display using a mouth-operated computer input device comprising a mouthpiece, and an optical device carried by the mouthpiece for emitting light from a surface area thereof. The method comprises inserting the mouth-operated computer input device into the user's mouth, and moving the user's tongue across the surface area of the optical device, with the optical device controlling movement of the cursor based upon movement of the user's tongue across the surface area.

DETAILED DESCRIPTION OF THE PREFERRED EMBODIMENTS

Figure 1:
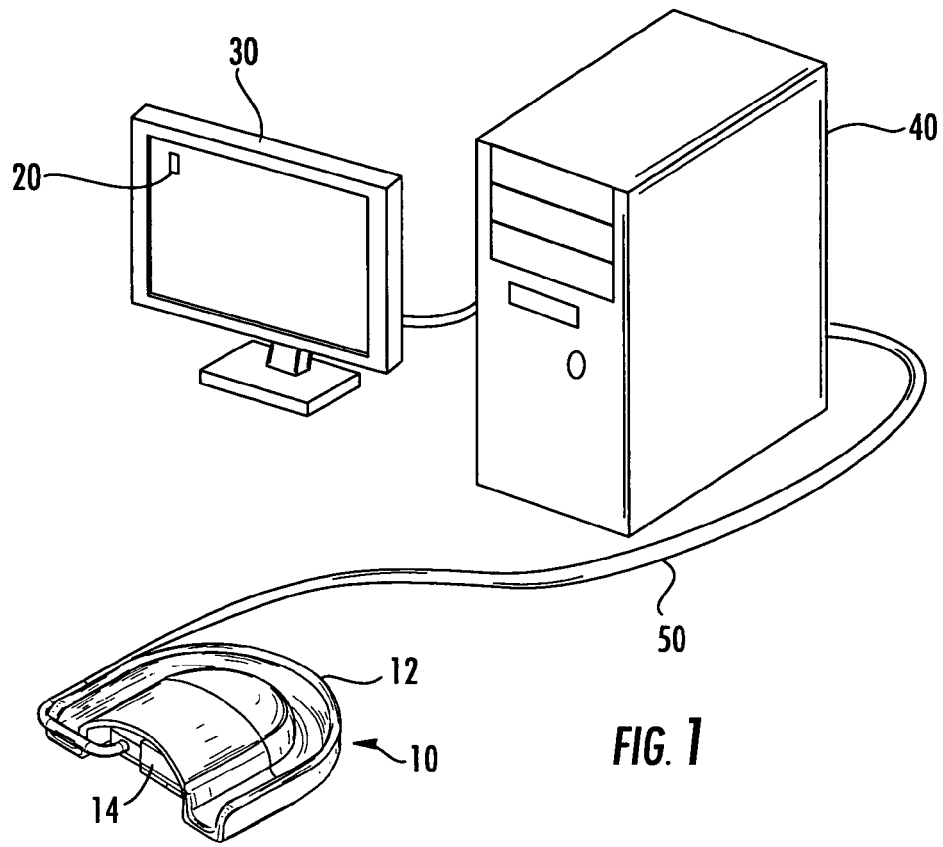
FIG. 1 is a perspective view of a mouth-operated computer mouse coupled to a computer system via a wired interface in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

A mouth-operated computer input device 10, 10' as illustrated in FIGS. 1-7 will now be discussed. The mouth-operated computer input device 10 is for controlling movement of a cursor 20 on a computer display 30 coupled to a computer system 40. Interface between the mouth-operated computer input device 10, 10' and the computer system 40 may be either a wired interface 50 or a wireless interface 52'.

Figure 2:
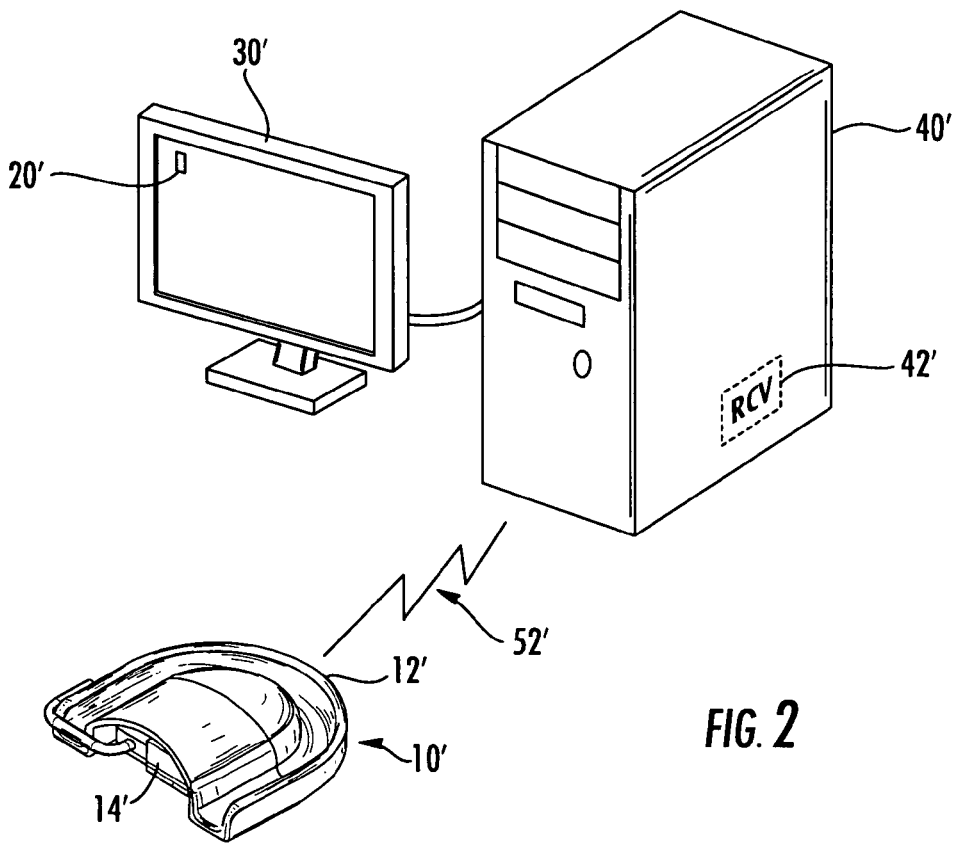
FIG. 2 is a perspective view of a mouth-operated computer mouse coupled to a computer system via a wireless interface in accordance with the present invention.
Figure 3:
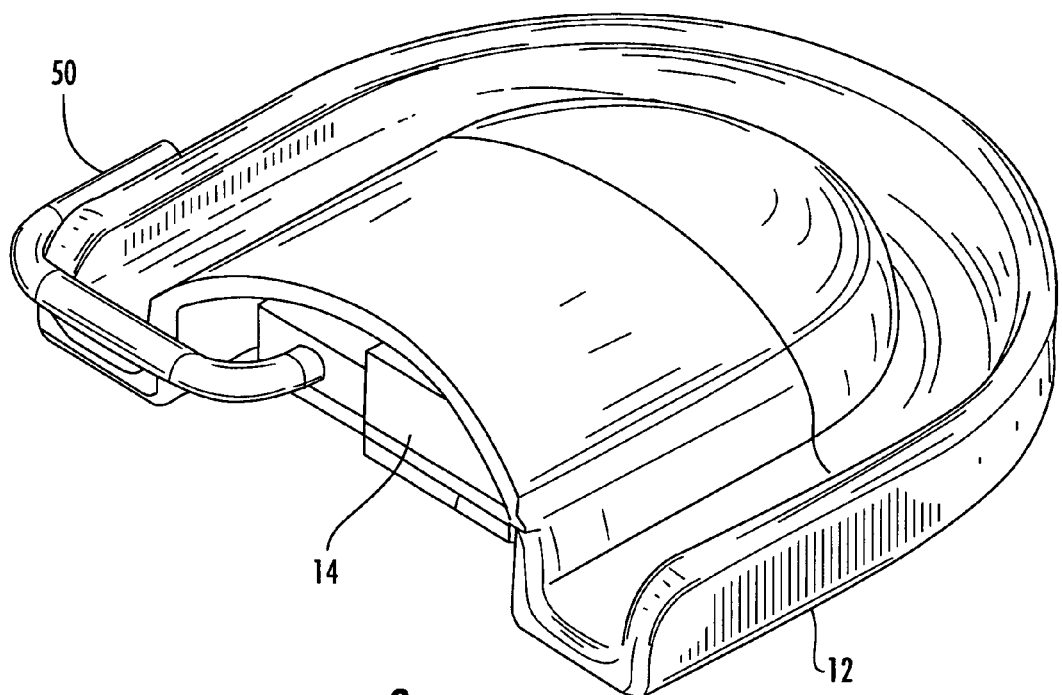
FIG. 3 is a top perspective view of the mouth-operated computer mouse shown in FIG. 1.
Figure 4:
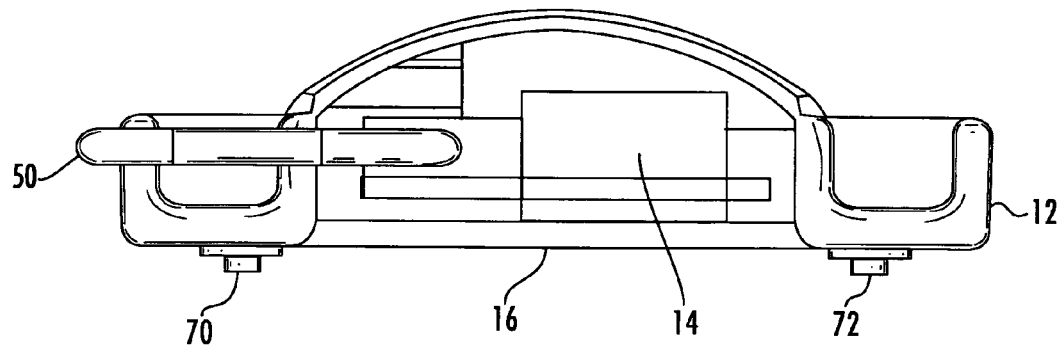
FIG. 4 is a backside view of the mouth-operated computer mouse shown in FIG. 1.
Figure 5:
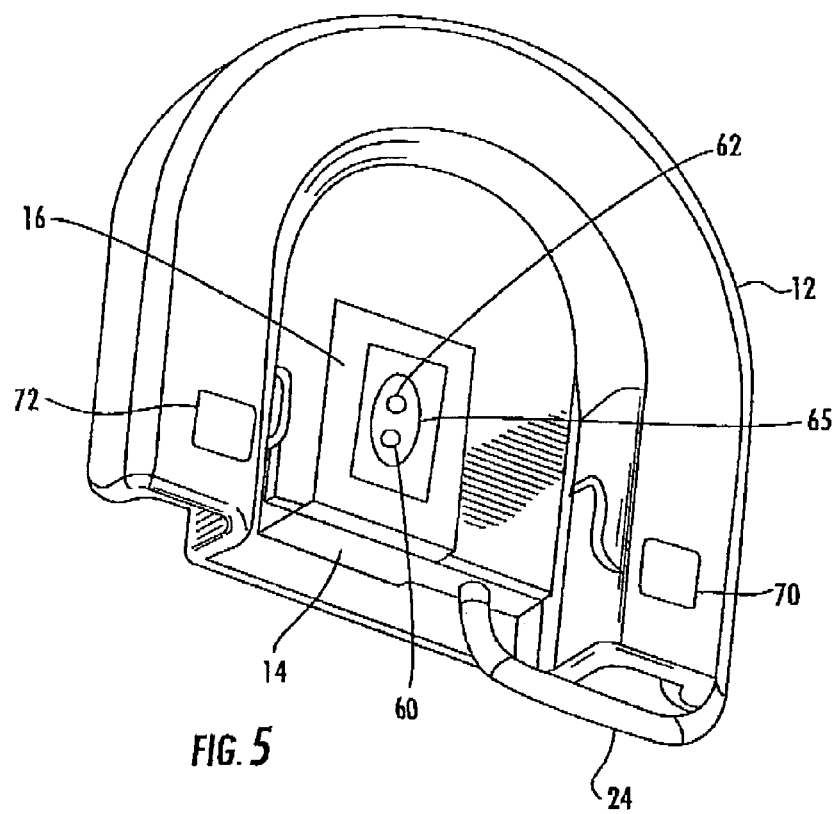
FIG. 5 is a bottom perspective view of the mouth-operated computer mouse shown in FIG. 1.
Figure 6:
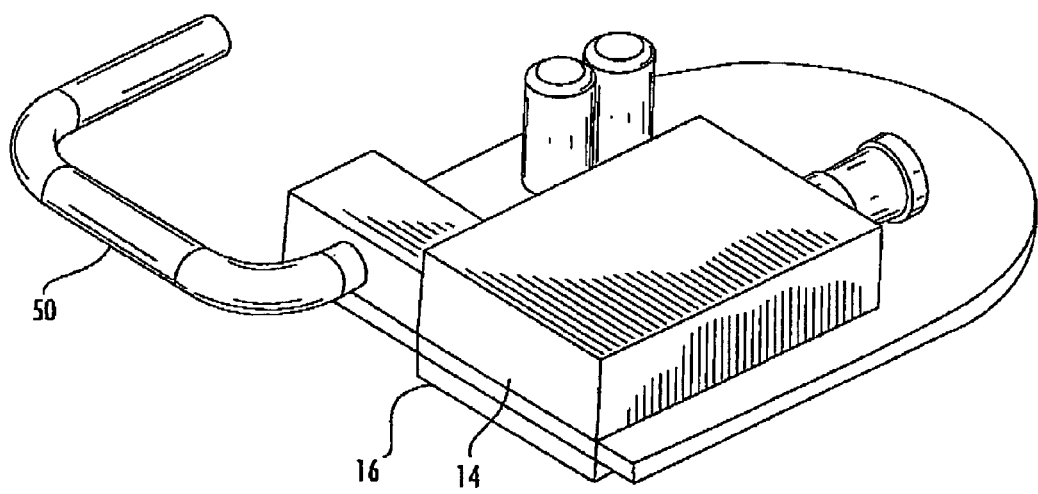
FIG. 6 is a perspective view of the optical device and associated electronics within the mouth-operated computer mouse shown in FIG. 1.
Figure 7:
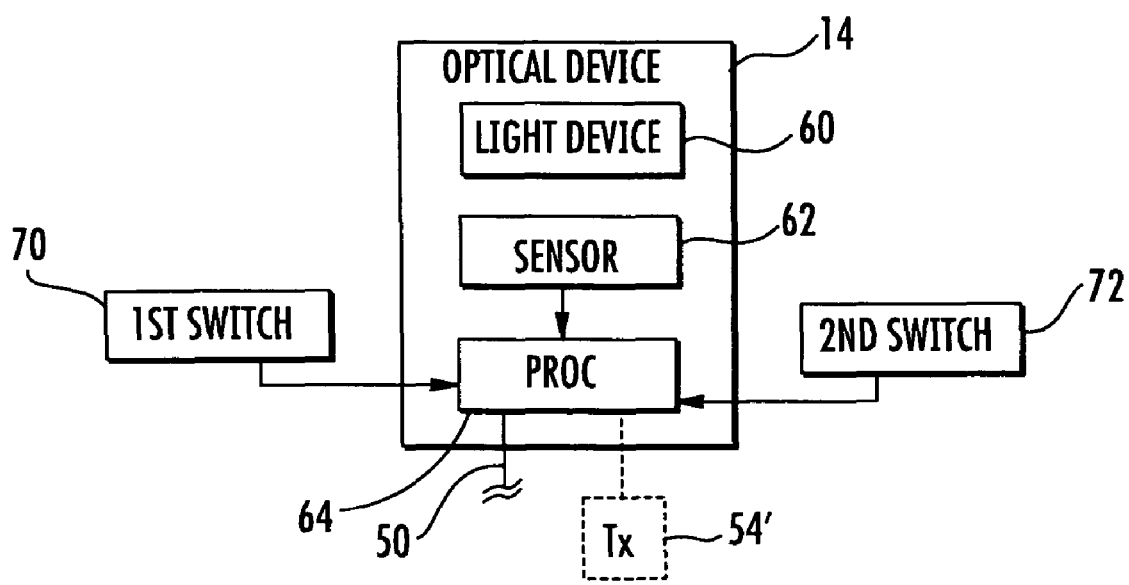
FIG. 7 is a block diagram of the optical device and associated electronics shown in FIG. 6.

For the wired interface 50, a universal serial bus (USB) interfaces between the mouth-operated computer input device 10 and the computer system 40. Other wired interface formats are acceptable, such as firewire, for example. For the wireless interface 52', the mouth-operated computer input device 10' includes a transmitter 54' for communicating with a receiver 42' carried by the computer system 40'. The receiver 42' may be internal the computer system 40' as shown in FIG. 2, or external.

The computer system 40 may be any type of computer, including a desktop computer, a laptop computer and a networked computer, for example. The mouth-operated computer input device 10 comprises a mouthpiece 12, and an optical device 14 carried by the mouthpiece for emitting light from a surface area 16 thereof. The mouth-operated computer input device 10 is inserted into the user's mouth, and the user moves their tongue across the surface area 16 of the optical device 14. The optical device 14 controls movement of the cursor 20 based upon movement of the user's tongue across the surface area.

The illustrated mouthpiece 12 is horseshoe-shaped, and is received by the teeth in the upper jaw of the user. In one embodiment, the optical device 14 is located in the central area of the upper maxilla. In other words, the surface area 16 of the optical device 14 forms a bridge across the mouthpiece 12. Although not shown, the surface area of the optical device 14 may be located directly behind the front teeth of the user in another embodiment.

Regardless of the location of the surface area 16, the user's tongue slides across the surface area to control movement of the cursor 20. Lifting the user's tongue from the surface area 16 of the optical device 14 stops motion of the cursor 20 in the same manner as lifting a hand-held mouse from its activating surface. The optical device 14 operates in the same manner as a hand-held optical mouse now commonly in use except for the optical medium being held stationary with respect to the user's head, and relative motion of the user's tongue being used to control movement of the cursor.

Movement of the user's tongue across the surface area 16 of the optical device 14 results in proportional movement (not speed) of the cursor 20. This advantageously allows the user to more easily navigate movement of the cursor 20. The mouth-operated computer mouse 10 thus provides control of a computer system 40 with the speed and precision of a hand-held mouse without use of any hands. This is desirable to any person with a physical handicap. It is also beneficial to any person wishing to avoid repetitive motion injury, or operating in an environment of severe vibration or acceleration or who has both hands otherwise occupied.

The optical device 14 comprises at least one light emitting device 60 for emitting the light, and a sensor 62 adjacent the light emitting device for sensing the light reflected from the user's tongue. The light emitting device 60 may comprise a light emitting diode or a laser diode, and the sensor 62 may comprise a digital camera, for example. The optical device 14 further comprises a processor 64 for calculating movement of the user's tongue based upon the light reflected from the user's tongue.

Optical navigation operates by scanning movement of the tongue's texture through a small optical window 65 surrounding the light emitting device 60 and sensor 62. No tongue pressure is required. However, there is a requirement that the tongue surface be within the depth-of-field of the sensor 62. The result is that large distances of tongue travel can be monitored, which reduces the number of tongue swipes required to move the cursor 20 to the desired location.

The mouth-operated computer input device 10 further comprises first and second tactile switches 70, 72. The first and second switches 70, 72 operate similar to the left and right mouse buttons on a hand-held mouse. The first switch 70 carried by the mouthpiece 12 is for clicking and dragging the cursor 20 on the computer display 30 based upon activation of the first switch. The second switch 72 carried by the mouthpiece 12 is for generating a pop-up window on the computer display 30 based upon activation of the second switch.

The first and second switches are preferably located over the molars, and are embedded in the mouthpiece 12 for providing a smooth surface that will not irritate the user's tongue. The mouth-operated computer mouse 10 is encapsulated in plastic, for example.

The optical device 14 thus operates in the same manner as a hand-held optical mouse now commonly in use for controlling a computer except the optical medium is held stationary with respect to the user's head, and relative motion of the user's tongue is used to control movement of the cursor.

Another aspect of a mouth-operated computer input device is directed to an alternative embodiment of linking the mouth-operated computer input device to the computer system. An optical link is used, which provides an image conduit to transmit an image from the mouth to a remote optical navigation chip. This type of image conduit is now being used for laparoscopic surgery, inspection devices and other systems that benefit from remote viewing without electronics, for example.

The mouse switching is accomplished with fiber optic links. There is a respective fiber optic cable corresponding to the left and right mouse buttons. Breaking the respective light beams from the fiber optic cables corresponds to selecting the left or right mouse buttons. As a result of the remote optical navigation chip, there are no electronics in the mouth of the user. As above, tongue motion controls the cursor, and jaw motion controls the switches, would be linked by an image conduit and fiber optics to an external electronic device, that would, in turn, be linked to a computer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A mouth-operated computer input device comprising:
a mouthpiece to be positioned in a user's mouth; and
an optical device carried by said mouthpiece for emitting light from a surface area thereof towards the user's tongue, and for controlling movement of a cursor on a computer display based upon movement of the user's tongue across the surface area, said optical device comprising
an optical window within the surface area,
at least one light emitting device for emitting the light through the optical window towards the user's tongue, and
a sensor adjacent said at least one light emitting device for sensing the light reflected from the user's tongue back into the optical window.

2. A mouth-operated computer input device according to claim 1 wherein said at least one light emitting device comprises at least one of a light emitting diode and a laser diode.

3. A mouth-operated computer input device according to claim 1 wherein said sensor comprises a digital camera.

4. A mouth-operated computer input device according to claim 1 wherein said optical device further comprises a processor for calculating movement of the user's tongue based upon the light reflected from the user's tongue.

5. A mouth-operated computer input device according to claim 1 further comprising a first switch carried by said mouthpiece for clicking and dragging the cursor on the computer display based upon activation of said first switch.

6. A mouth-operated computer input device according to claim 1 wherein the cursor is generated based upon a windows-based operating system; and further comprising a second switch carried by said mouthpiece for generating a pop-up window on the computer display based upon activation of said second switch.

7. A mouth-operated computer input device according to claim 1 wherein the cursor is generated based upon a computer system; and further comprising a cable coupled to said optical device for interfacing with the computer system.

8. A mouth-operated computer input device according to claim 7 wherein the cable comprises at least one of a universal serial bus (USB) cable and a firewire cable.

9. A mouth-operated computer input device according to claim 1 wherein the cursor is generated based upon a computer system; and further comprising a wireless transmitter carried by said mouthpiece for interfacing with the computer system.

10. A mouth-operated computer input device according to claim 1 wherein said mouthpiece is horseshoe shaped and surrounds a row of teeth in the user's mouth.

11. A mouth-operated computer input device according to claim 10 wherein the surface area of said optical device forms a bridge across the horseshoe shaped mouthpiece.

12. A mouth-operated computer input device comprising:
a horseshoe-shaped mouthpiece to be positioned in a user's mouth; and
an optical device carried by said mouthpiece and comprising a surface area forming a bridge, across said mouthpiece, said optical device for emitting light from the surface area thereof towards the user's tongue, and for controlling movement of a cursor on a computer display based upon movement of the user's tongue across said surface area, said optical device comprising
an optical window within the surface area,
at least one light emitting device for emitting the light through the optical window towards the user's tongue, and
a sensor adjacent said at least one light emitting device for sensing the light reflected from the user's tongue back into the optical window.

13. A mouth-operated computer input device according to claim 12 wherein said optical device further comprises a processor for calculating movement of the user's tongue based upon the light reflected from the user's tongue.

14. A mouth-operated computer input device according to claim 12 wherein the cursor is generated based upon a windows-based operating system; and further comprising:
a first switch carried by said mouthpiece for clicking and dragging the cursor on the computer display based upon activation of said first switch; and
a second switch carried by said mouthpiece for generating a pop-up window on the computer display based upon activation of said second switch.

15. A mouth-operated computer input device according to claim 12 wherein said optical device communicates to the computer display via a wired connection.

16. A mouth-operated computer input device according to claim 12 wherein said optical device communicates to the computer display via a wireless connection.

17. A method for controlling movement of a cursor on a computer display using a mouth-operated computer input device comprising a mouthpiece, and an optical device carried by the mouthpiece for emitting light from a surface area thereof, the method comprising:
inserting the mouth-operated computer input device into the user's mouth; and
moving the user's tongue across the surface area of the optical device, with the optical device controlling movement of the cursor based upon movement of the user's tongue across the surface area, with the optical device comprising an optical window within the surface area, at least one light emitting device for emitting the light through the optical window towards the user's tongue, and a sensor adjacent the at least one light emitting device for sensing the light reflected from the user's tongue back into the optical window.

18. A method according to claim 17 wherein the optical device further comprises a processor for calculating movement of the user's tongue based upon the light reflected from the user's tongue.

19. A method according to claim 17 wherein the mouth-operated computer input device further comprises a first switch carried by the mouthpiece for clicking and dragging the cursor on the computer display based upon activation of the first switch.

20. A method according to claim 17 wherein the cursor is generated based upon a windows-based operating system; and wherein the mouth-operated computer input device further comprises a second switch carried by the mouthpiece for generating a pop-up window on the computer display based upon activation of said second switch.

21. A method according to claim 17 wherein the mouth-operated computer input device communicates with the computer display cursor via a wired connection.

22. A method according to claim 17 wherein the mouth-operated computer input device communicates with the computer display cursor via a wireless connection.

* * * * *